US009396141B2

(12) United States Patent
Maeda et al.

(10) Patent No.: US 9,396,141 B2
(45) Date of Patent: Jul. 19, 2016

(54) MEMORY SYSTEM AND INFORMATION PROCESSING DEVICE BY WHICH DATA IS WRITTEN AND READ IN RESPONSE TO COMMANDS FROM A HOST

(71) Applicant: Kabushiki Kaisha Toshiba, Minato-ku (JP)

(72) Inventors: Kenichi Maeda, Kamakura (JP); Nobuhiro Kondo, Yokohama (JP); Kenichiro Yoshii, Bunkyo-ku (JP); Keigo Hara, Ota-ku (JP); Toshio Fujisawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 201 days.

(21) Appl. No.: 14/200,679

(22) Filed: Mar. 7, 2014

(65) Prior Publication Data

US 2015/0046634 A1    Feb. 12, 2015

(30) Foreign Application Priority Data

Aug. 7, 2013   (JP) ................................. 2013-164282

(51) Int. Cl.
*G06F 13/00* (2006.01)
*G06F 13/28* (2006.01)
(Continued)

(52) U.S. Cl.
CPC ............ *G06F 13/28* (2013.01); *G06F 12/0868* (2013.01); *G06F 12/0888* (2013.01); *G06F 12/0246* (2013.01); *G06F 12/0871* (2013.01);
(Continued)

(58) Field of Classification Search
CPC ... G06F 3/0656; G06F 3/0679; G06F 3/0688; G06F 12/0868; G06F 12/0888; G06F 12/0246; G06F 12/0871; G06F 13/28; G06F 2212/1016; G06F 2212/311; G06F 2212/7201; G06F 12/0238

USPC ............ 711/103, 122, 132, 147, 165; 710/20, 710/38; 712/27, 36, 225

See application file for complete search history.

(56) References Cited

U.S. PATENT DOCUMENTS 6,219,073 B1   4/2001   Suzuoki
6,233,648 B1   5/2001   Tomita
(Continued)

FOREIGN PATENT DOCUMENTS

JP    10-269165    10/1998
JP    11-194899    7/1999
(Continued)

*Primary Examiner* — Reba I Elmore
(74) *Attorney, Agent, or Firm* — Oblon, McClelland, Maier & Neustadt, L.L.P.

(57) ABSTRACT

According to embodiments a memory system is connectable to a host which includes a host controller and a host memory including a first memory area and a second memory area. The memory system includes an interface unit, a non-volatile memory, and a controller unit. The interface unit receives a read command and a write command. The controller unit writes write-data to the non-volatile memory according to the write command. The controller unit determines whether read-data requested by the read command is in the first memory area. If the read-data is in the first memory area, the controller unit causes the host controller to copy the read-data from the first memory area to the second memory area. If the read-data is not in the first memory area, the controller unit reads the read-data from the non-volatile memory and causes the host controller to store the read-data in the second memory area.

16 Claims, 8 Drawing Sheets

(51) Int. Cl.
 *G06F 12/08* (2016.01)
 *G06F 12/02* (2006.01)

(52) U.S. Cl.
 CPC ... *G06F 2212/1016* (2013.01); *G06F 2212/311* (2013.01); *G06F 2212/7201* (2013.01)

(56) References Cited

U.S. PATENT DOCUMENTS

| | | |
|---|---|---|
| 6,516,380 B2 | 2/2003 | Kenchammana-Hoskote et al. |
| 2005/0235072 A1* | 10/2005 | Smith .................... G06F 13/28 710/22 |
| 2007/0147115 A1* | 6/2007 | Lin ..................... G06F 13/1694 365/185.08 |
| 2008/0215800 A1* | 9/2008 | Lee ....................... G06F 3/0613 711/103 |
| 2008/0301385 A1* | 12/2008 | Nagata .................... G06F 3/061 711/162 |
| 2009/0287878 A1* | 11/2009 | Yamamoto ............ G06F 3/0616 711/103 |
| 2011/0072228 A1* | 3/2011 | Nagata .................... G06F 3/061 711/162 |
| 2011/0238899 A1 | 9/2011 | Yano et al. |
| 2011/0314204 A1* | 12/2011 | Ootsuka ............. G06F 12/0246 711/103 |
| 2012/0017033 A1* | 1/2012 | Moritoki ............. G06F 11/1441 711/103 |
| 2013/0290647 A1 | 10/2013 | Maeda et al. |
| 2014/0317335 A1* | 10/2014 | Fukutomi ............. G06F 3/0685 711/103 |

FOREIGN PATENT DOCUMENTS

| | | |
|---|---|---|
| JP | 2002-323959 | 11/2002 |
| JP | 2010-157142 | 7/2010 |

\* cited by examiner

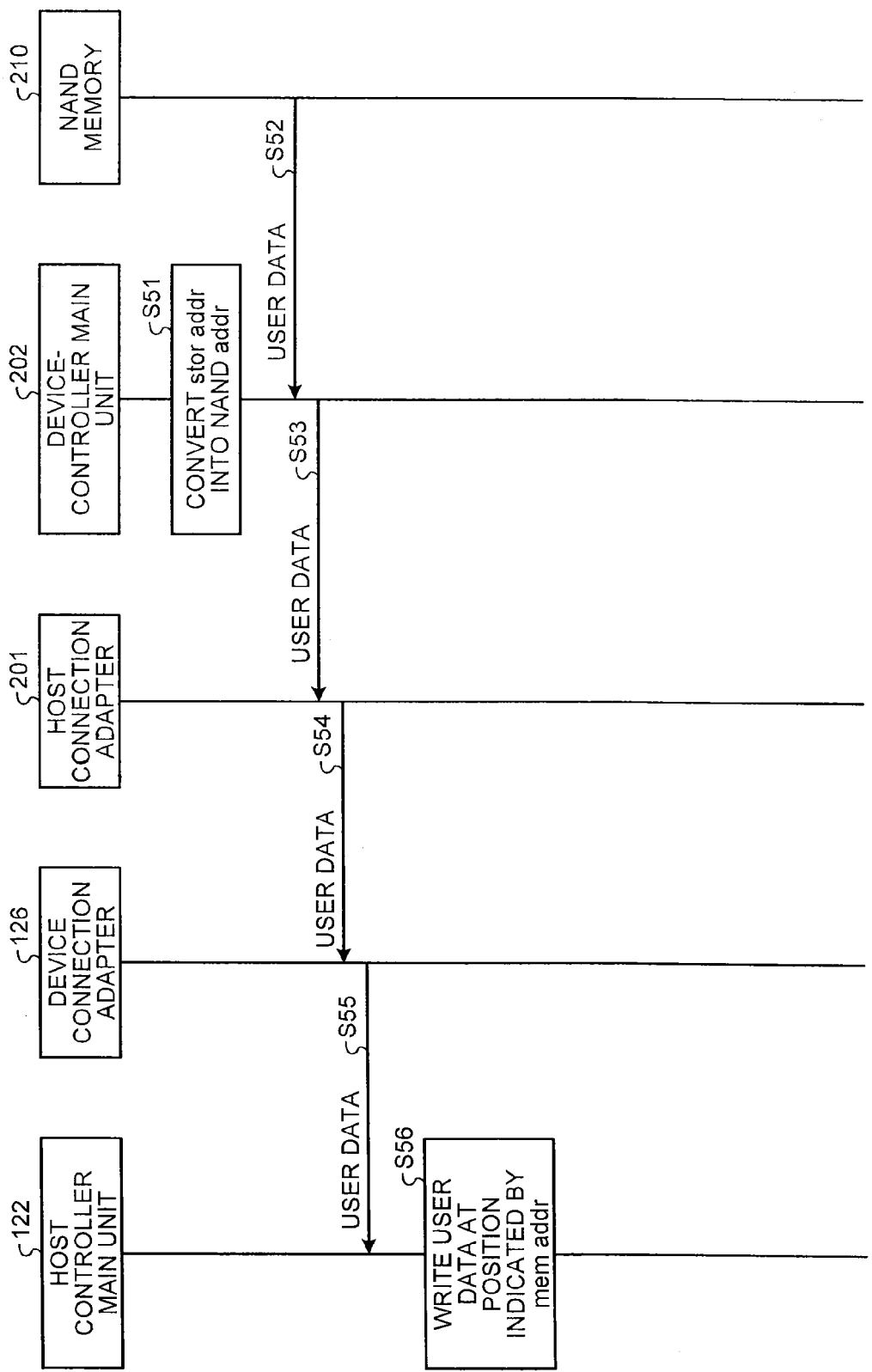

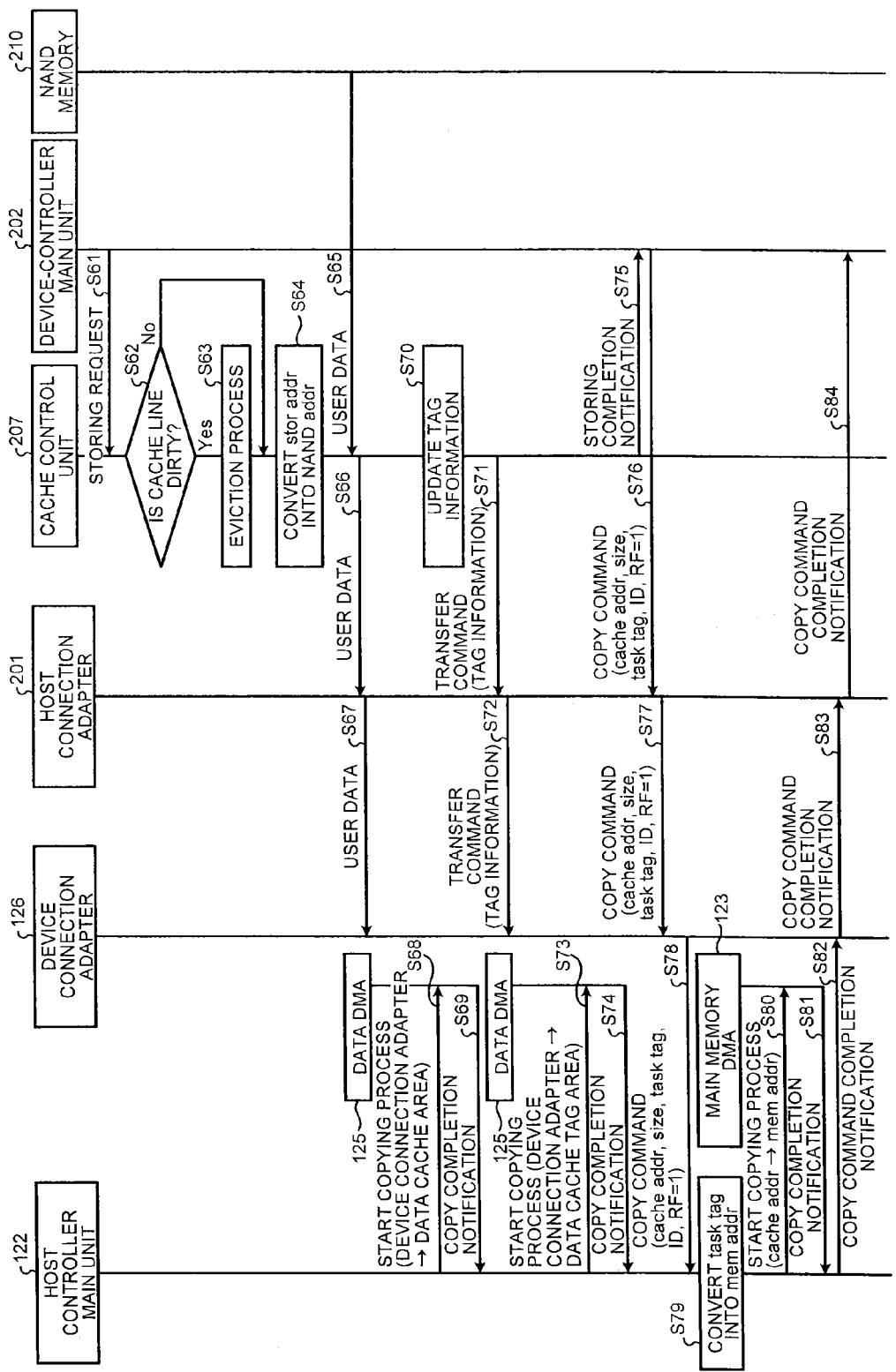

MEMORY SYSTEM AND INFORMATION PROCESSING DEVICE BY WHICH DATA IS WRITTEN AND READ IN RESPONSE TO COMMANDS FROM A HOST

CROSS-REFERENCE TO RELATED APPLICATIONS

This application is based upon and claims the benefit of priority from Japanese Patent Application No. 2013-164282, filed on Aug. 7, 2013; the entire contents of which are incorporated herein by reference.

FIELD

Embodiments described herein relate generally to a memory system and an information processing device.

BACKGROUND

Heretofore, UMA (Unified Memory Architecture) has been known. UMA is a memory architecture in which a host and a device share a memory mounted on the host. With UMA, the memory cost can be reduced.

BRIEF DESCRIPTION OF THE DRAWINGS

FIG. 7 is a sequence diagram explaining a miss-time transferring process in the first embodiment; and FIG. 8 is a sequence diagram explaining a miss-time transferring process in a second embodiment.

DETAILED DESCRIPTION

According to embodiments a memory system is connectable to a host. The host includes a host controller and a host memory comprising a first memory area and a second memory area. The memory system includes an interface unit, a non-volatile memory, and a controller unit. The interface unit receives a read command and a write command from the host. The controller unit writes write-data to the non-volatile memory according to the write command. The controller unit determines whether read-data requested by the read command is in the first memory area. If the read-data is in the first memory area, the controller unit causes the host controller to copy the read-data from the first memory area to the second memory area. If the read-data is not in the first memory area, the controller unit reads the read-data from the non-volatile memory and causes the host controller to store the read-data read from the non-volatile memory in the second memory area.

Exemplary embodiments of a memory system and an information processing device will be explained below in detail with reference to the accompanying drawings. The present invention is not limited to these embodiments.

First Embodiment

Figure 1:
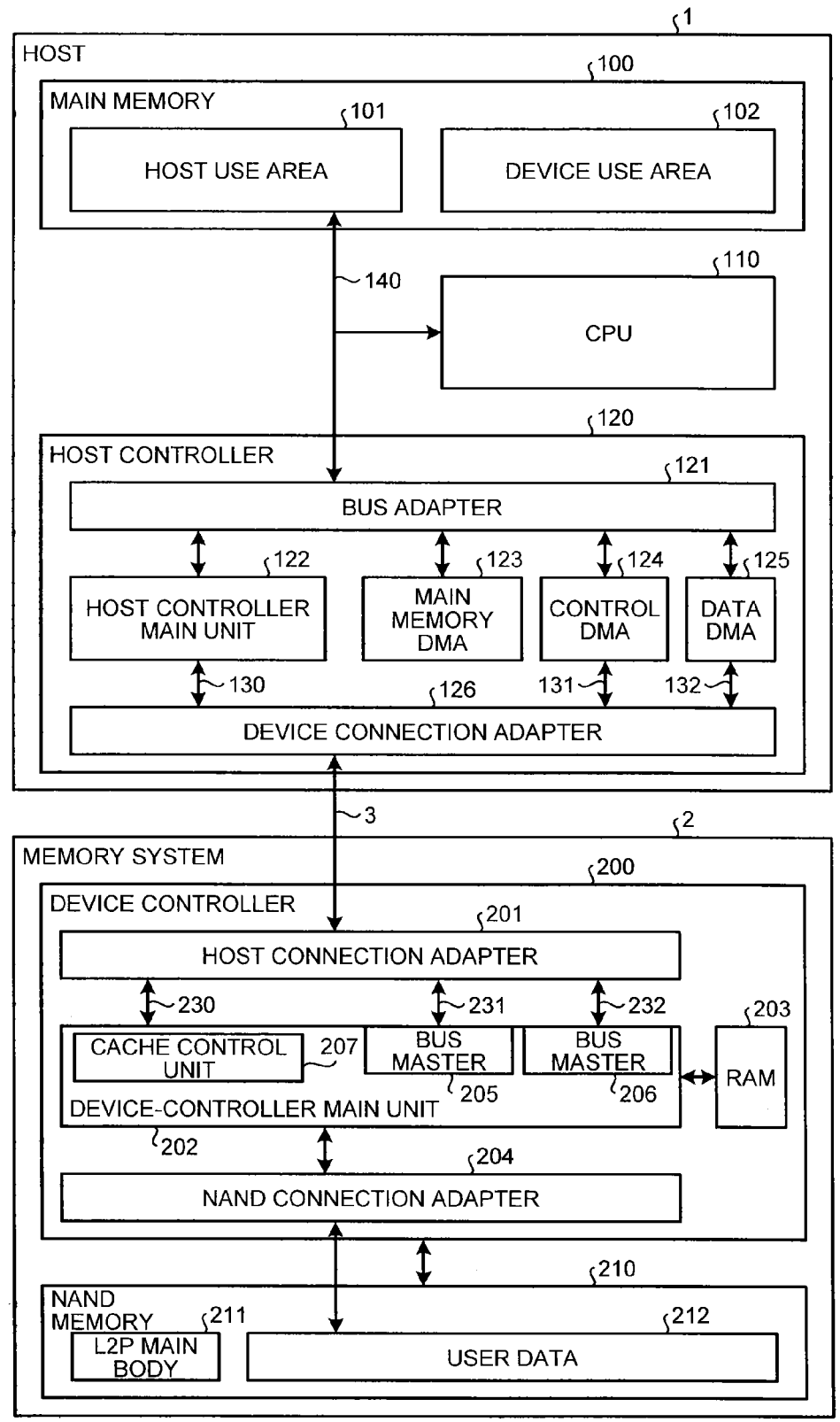
FIG. 1 is a diagram illustrating a configuration example of an information processing device according to a first embodiment.

FIG. 1 is a diagram illustrating a configuration example of an information processing device according to a first embodiment. The information processing device includes a host 1 and a memory system 2, which functions as an external memory device of the host 1. The host 1 and the memory system 2 are connected via a communication path 3.

The information processing device is, for example, a personal computer, a mobile phone, or an imaging device. The standard to which the memory system 2 conforms and the standard to which the communication path 3 conforms are arbitrary. For example, the memory system 2 is a flash memory conforming to the UFS (Universal Flash Storage) standard. For example, the MIPI (Mobile Industry Processor Interface) M-PHY is used as a communication standard by the communication path 3.

The memory system 2 includes a NAND flash memory (NAND memory) 210 that is a non-volatile memory and a device controller 200 that transfers data between the NAND memory 210 and the host 1. Memories other than a NAND flash memory can also be used as the non-volatile memory of the memory system 2. For example, an MRAM (magnetoresistive random access memory), an ReRAM (resistance random access memory), or the like can be used.

The NAND memory 210 is composed of one or more memory chips each including a memory cell array. The memory cell array is such that a plurality of memory cells are arranged in a matrix. Each memory cell array is composed of a plurality of blocks with each block being a unit in which data is erased. Furthermore, each block is composed of a plurality of pages. Each page is a unit in which data is written and read.

The NAND memory 210 stores therein an L2P table 211 and user data (user data 212) transmitted from the host 1. The user data 212 includes, for example, an operating system program (OS) that provides the execution environment of the host 1, a user program executed by the host 1 on the OS, or data input or output by the OS or the user program.

The L2P table 211 is one of the pieces of management information necessary for the memory system 2 to function as an external memory device with respect to the host 1. The L2P table 211 is address translation information in which logical block addresses (LBAs: Logical block addresses), which are used when the host 1 accesses the memory system 2, and physical addresses (block address+page address+storage position in a page) in the NAND memory 210 are associated with each other. At least part of the L2P table 211 is temporarily stored (i.e., cached) in an L2P cache area 300, which will be described later. In order to be distinguished from the content cached in the L2P cache area 300, the L2P table 211 stored in the NAND memory 210 is hereinafter referred to as the L2P main body 211.

The device controller 200 includes a host connection adapter 201 that is a connection interface with the communication path 3, a NAND connection adapter 204 that is a connection interface with the NAND memory 210, a device-controller main unit 202 that controls the device controller 200, and a RAM 203.

The RAM 203 is used as a buffer for transferring data between the NAND memory 210 and the host 1. Moreover, the RAM 203 is used as a command queue that queues commands received from the host 1. Each command transmitted from the host 1 includes identification information unique to that command. In the host 1 and the memory system 2, when a plurality of commands are transmitted and received, each command is identified by using the identification information.

The device-controller main unit 202 controls data transfer between the host 1 and the RAM 203 via the host connection adapter 201 and controls data transfer between the RAM 203 and the NAND memory 210 via the NAND connection adapter 204. The device-controller main unit 202 functions as a bus master for the communication path 3 between the host 1 and the memory system 2 and performs data transfer by using a first port 230. The device-controller main unit 202 further includes two bus masters 205 and 206. The bus master 205 can perform data transfer for the host 1 by using a second port 231 and the bus master 206 can perform data transfer for the host 1 by using a third port 232.

Moreover, the device-controller main unit 202 includes a cache control unit 207. The cache control unit 207 controls caches (the L2P cache area 300, an L2P cache tag area 310, a data cache area 400, and a data cache tag area 410) reserved in a device use area 102. The caches reserved in the device use area 102 will be described later.

The device-controller main unit 202 is composed of a microprocessor that includes, for example an execution unit and a memory unit. The execution unit performs the firmware prestored in the memory unit, whereby the function of the device-controller main unit 202 is realized. For example, the cache control unit 207 is realized by the firmware running on the microprocessor. The memory unit may be eliminated from the device-controller main unit 202 and the firmware may be stored in the NAND memory 210. Moreover, at least part of the device-controller main unit 202 can be configured by hardwired logic.

The host 1 includes a CPU 110 that executes the OS and the user program, a memory 100 (for example, the main memory of the host 1, hereinafter, the main memory 100), and a host controller 120. The main memory 100, the CPU 110, and the host controller 120 are connected with each other via a bus 140.

The main memory 100 is, for example, a DRAM. The main memory 100 may be, for example, an MRAM or an FeRAM. The main memory 100 includes a host use area 101 (second memory area) and the device use area 102 (first memory area). The host use area 101 is used as a program deployed area when the host 1 executes programs (OS and user program) and a work area when the programs deployed in the program deployed area are executed. The device use area 102 is a memory area used by the memory system 2. For example, a fixed memory area of the main memory 100 is allocated as the device use area 102. The device use area 102 is used as an area that stores therein, for example, the L2P cache area 300, the L2P cache tag area 310, the data cache area 400, and the data cache tag area 410, which will be described later.

Figure 2:
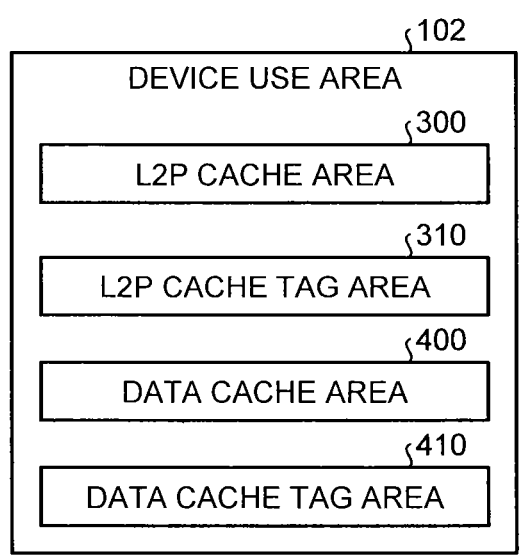
FIG. 2 is a diagram explaining the memory structure of a device use area.

FIG. 2 is a diagram explaining the memory structure of the device use area 102. As illustrated in FIG. 2, the L2P cache area 300, the L2P cache tag area 310, the data cache area 400, and the data cache tag area 410 are reserved in the device use area 102. At least part of the L2P main body 211 is cached in the L2P cache area 300. Tag information used for performing a hit/miss determination in the L2P cache area 300 is stored in the L2P cache tag area 310. The data cache area 400 is a memory area having a cache structure in which the user data 212 is buffered. Tag information used for performing a hit/miss determination in the data cache area 400 is stored in the data cache tag area 410. The L2P cache tag area 310 and the data cache tag area 410 include control information including a VB (Valid Buffer) bit and a DB (Dirty Buffer) bit. The VB bit indicates whether a cache line is valid. The DB bit indicates whether a cache line is dirty or clean.

The host controller 120 includes a bus adapter 121, a device connection adapter 126, and a host controller main unit 122. The bus adapter 121 is a connection interface with the bus 140. The device connection adapter 126 is a connection interface with the communication path 3. The host controller main unit 122 is connected to the device connection adapter 126 via a first port 130. The host controller main unit 122 can transfer data or commands for the main memory 100 or the CPU 110 via the bus adapter 121 and can transfer data for the memory system 2 via the device connection adapter 126 and the first port 130.

Moreover, the host controller 120 includes a main memory DMA (Dynamic Memory Access) 123, a control DMA 124, and a data DMA 125. The main memory DMA 123 performs DMA transfer between the host use area 101 and the device use area 102. The control DMA 124 is connected to the device connection adapter 126 via a second port 131. The control DMA 124 captures a command transmitted from the memory system 2 and transfers the command to the host controller main unit 122 or the main memory DMA 123 and transfers status information on the device use area 102 from the host controller main unit 122 to the memory system 2. The data DMA 125 is connected to the device connection adapter 126 via a third port 132. The data DMA 125 performs DMA transfer between the device use area 102 and the memory system 2.

Due to the functions of the device connection adapter 126 and the host connection adapter 201, the first port 130 is associated with the first port 230, the second port 131 is associated with the second port 231, and the third port 132 is associated with the third port 232. Specifically, the host connection adapter 201 transmits the content transmitted to the memory system 2 via the first port 130 to the device-controller main unit 202 via the first port 230, transmits the content transmitted to the memory system 2 via the second port 131 to the device-controller main unit 202 via the second port 231, and transmits the content transmitted to the memory system 2 via the third port 132 to the device-controller main unit 202 via the third port 232. Moreover, the device connection adapter 126 transmits the content transmitted to the host 1 via the first port 230 to the host controller main unit 122 via the first port 130, transmits the content transmitted to the host 1 via the second port 231 to the control DMA 124 via the second port 131, and transmits the content transmitted to the host 1 via the third port 232 to the data DMA 125 via the third port 132. The content transmitted to the control DMA 124 and the content transmitted to the data DMA 125 are transmitted to the host controller main unit 122, for example, via the bus adapter 121.

Each of the ports 130 to 132 independently includes an input/output buffer that is used for communication with respect to the memory system 2. The host controller main unit 122, the control DMA 124, and the data DMA 125 are connected to the memory system 2 by using the different input/output buffers, respectively; therefore, the host controller 120 can independently perform communication with respect to the memory system 2 using the host controller main unit 122, communication with respect to the memory system 2 using the control DMA 124, and communication with respect to the memory system 2 using the data DMA 125. Moreover, because it is possible to switch between these communications without changing the input/output buffer, communication can be switched at high speed. The same can be applied to the ports 230 to 232 included in the memory system 2.

The CPU 110 can generate user data in the host use area 101 on the basis of the control in accordance with the program being executed. When a write command is issued by the CPU 110, user data as a write target is copied to the data cache area 400 of the device use area 102 from the host use area 101 under the instruction of the device-controller main unit 202 that has received the write command. In other words, the user data as a write target is stored in the data cache area 400. The user data as a write target stored in the data cache area 400 is transferred to the memory system 2 at a predetermined timing and is stored in a non-volatile memory as the user data 212 in the NAND memory 210. The process of transferring user data stored in the data cache area 400 to the NAND memory 210 is referred to as an eviction process (Write back).

Moreover, the CPU 110 can read user data that the program being executed requires to the host use area 101. When the CPU 110 reads user data, the CPU 110 issues a read command (first read command) to read the user data 212 to the host use area 101. At the point when the first read command is issued, the user data as a read target is stored in the data cache area 400 or is not stored in the data cache area 400. In the first embodiment, when the user data as a read target is stored in the data cache area 400, the user data as a read target stored in the data cache area 400 is stored in the host use area 101 under the instruction of the device-controller main unit 202. When the user data as a read target is not stored in the data cache area 400, the user data stored in the NAND memory 210 is stored in the host use area 101.

The process from when the CPU 110 issues a write command to when user data is stored in the data cache area 400 or the NAND memory 210 is referred to as a write process. The process from when the CPU 110 issues a first read command to when user data as a read target is stored in the host use area 101 is referred to as a read process.

Next, the read process performed by the information processing device in the first embodiment will be explained.

Figure 3:
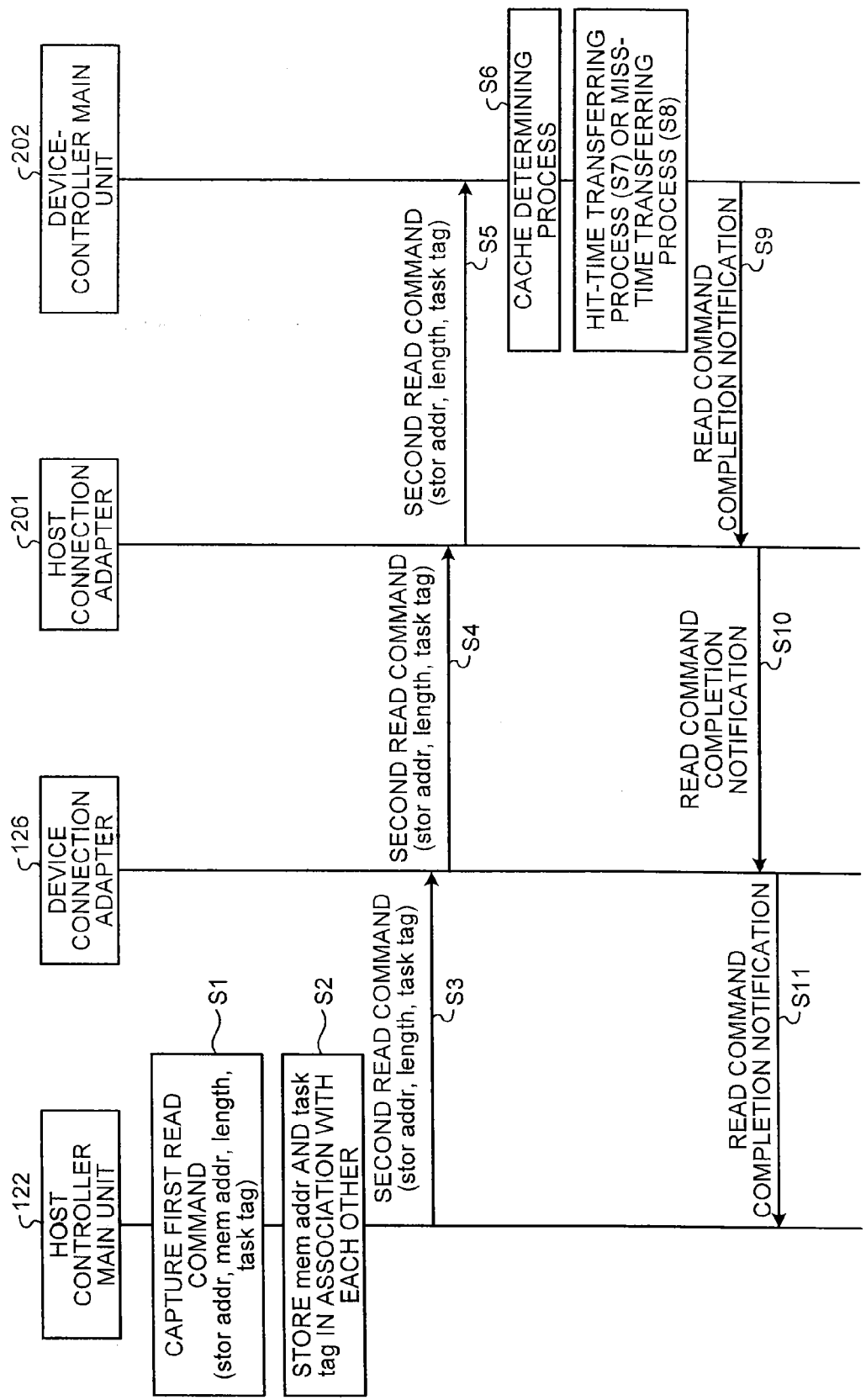
FIG. 3 is a sequence diagram explaining a read process.

FIG. 3 is a sequence diagram explaining the read process.

When the CPU 110 issues a first read command, the host controller main unit 122 captures the first read command (S1). The first read command includes a first address (stor addr) that indicates a read position in the NAND memory 210, a second address (mem addr) that indicates a position of a transfer destination in the host use area 101, the data size (length), and first-read-command identification information (task tag). The first-read-command identification information is information in which a different value is set for at least each first read command transmitted to the memory system 2 from the host 1. In other words, when the CPU 110 generates a plurality of first read commands, it is possible to distinguish between the first read commands by referring to the "task tag". Typically, the memory system is composed of a plurality of logical units (Logical Units) and, in this case, it is necessary to specify which logical unit is to be accessed (Logical Unit Number=LUN). An explanation will be however made of an example of a single logical unit for simplicity and the LUN is omitted. The "stor addr" is represented, for example, using an LBA. The "task tag" may not be included in the first read command and may be generated by the host controller main unit 122 after the capture of the first read command.

The host controller main unit 122 reads the "mem addr" and the identification information from the captured first read command and stores the read "mem addr" and identification information in the memory in the host controller main unit 122 in association with each other (S2). When the CPU 110 issues a plurality of first read commands, the host controller main unit 122 can store therein a plurality of correspondence relationships between the "mem addr" and the first-read-command identification information.

Next, the host controller main unit 122 transmits information (second read command) obtained by excluding the "mem addr" from the various pieces of information included in the first read command to the device connection adapter 126 (S3). In other words, the second read command includes the "stor addr", the "length", and the "task tag". The device connection adapter 126 transfers the second read command to the host connection adapter 201 (S4).

The host connection adapter 201 transfers the second read command to the device-controller main unit 202 (S5). When the device-controller main unit 202 receives the second read command, the device-controller main unit 202 determines whether user data as a read target is stored in the data cache area 400 (cache determining process, S6). When the device-controller main unit 202 determines that the user data as a read target is stored in the data cache area 400 (i.e., in the case of a hit), a hit-time transferring process is performed (S7). When the device-controller main unit 202 determines that the user data as a read target is not stored in the data cache area 400 (i.e., in the case of a miss), a miss-time transferring process is performed (S8).

As described above, when the CPU 110 issues a write command, user data as a write target is stored in the data cache area 400 of the main memory 100, is transferred to the memory system 2 at a predetermined timing, and is stored in the NAND memory 210. In the case where the user data as a write target is stored in the data cache area 400, when the CPU 110 issues a read command with respect to this user data as a write target, this corresponds to "the case of a hit" described above and the hit-time transferring process is performed. In contrast, in the case where the user data as a write target is transferred to the memory system 2 from the data cache area 400 and is stored in the NAND memory 210 as user data, when the CPU 110 issues a read command with respect to this user data, this corresponds to "the case of a miss" described above and the miss-time transferring process is performed.

Figure 4:
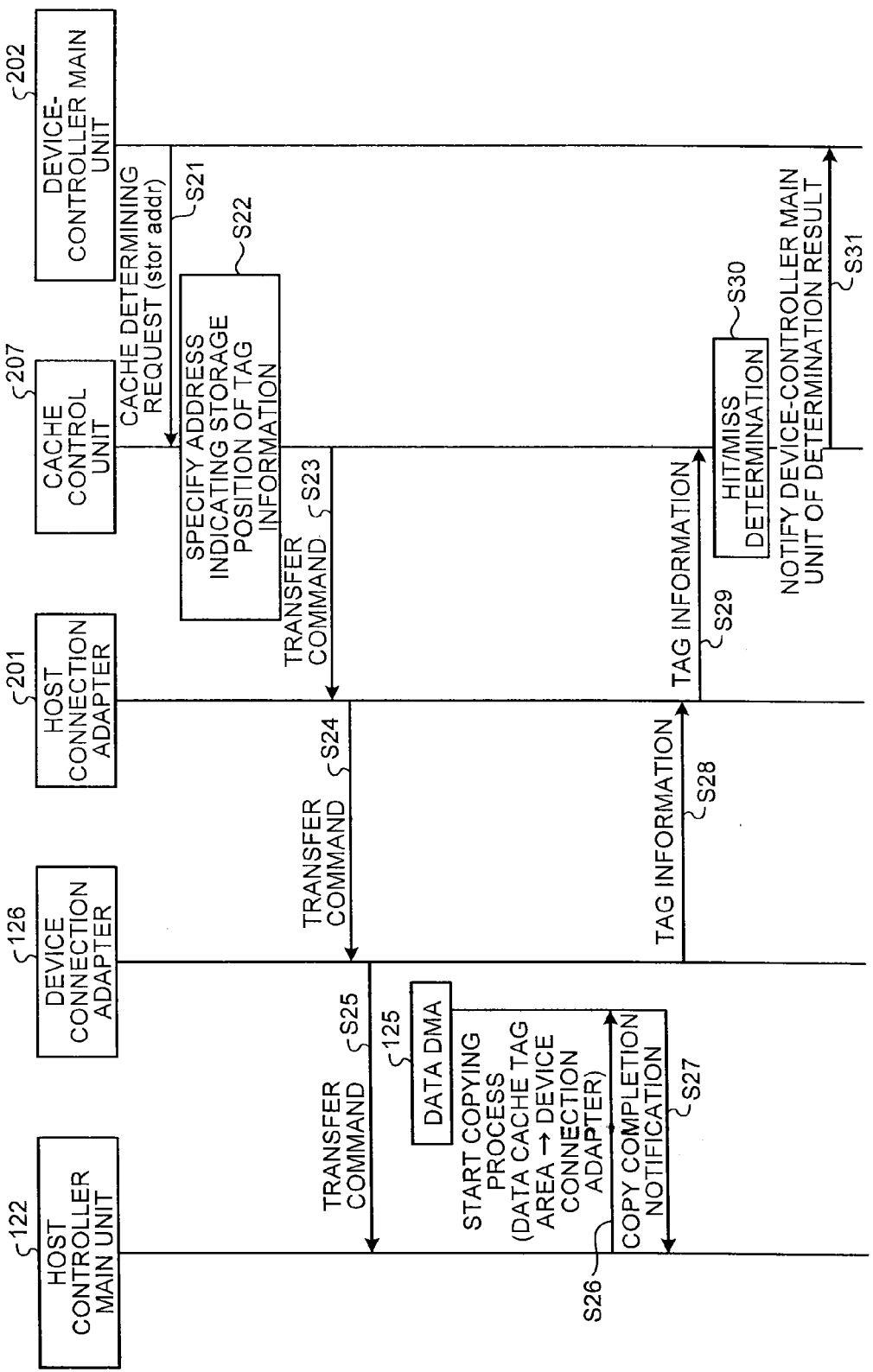
FIG. 4 is a sequence diagram explaining a cache determining process.

FIG. 4 is a sequence diagram explaining the cache determining process.

In the cache determining process, first, the device-controller main unit 202 transmits a cache determining request to the cache control unit 207 (S21). The cache determining request includes the "stor addr" included in the second read command and cache-determining-request identification information. The cache-determining-request identification information is identification information in which a different value is set for at least each cache determining request transmitted to the host 1 from the memory system 2. The cache control unit 207 specifies the address indicating a storage position of the tag information corresponding to the "stor addr" in the data cache tag area 410 on the basis of the "stor addr" (S22). Then, the cache control unit 207 transmits to the host connection adapter 201 a transfer command to read the tag information using the position indicated by the specified address as the read position of the tag information (S23). The host connection adapter 201 transfers the transfer command to the device connection adapter 126 (S24). The transfer command received by the device connection adapter 126 is transferred to the host controller main unit 122 by the control DMA 124 (S25). The transfer command in S23, S24, and S25 includes the cache determining request identification information included in the cache determining request.

The host controller main unit 122 starts a copying process of copying the tag information from the data cache tag area 410 to the device connection adapter 126 (to be exact, a buffer included in the device connection adapter 126) performed by the data DMA 125 (S26). The read position in the data cache tag area 410 is the position indicated by the address specified in Step S22. When the data DMA 125 completes the copying process, the data DMA 125 transmits a notification of the completion of the copying process (copy completion notification) to the host controller main unit 122 (S27).

After the copying process is completed, the device connection adapter 126 transfers the tag information transmitted by the copying process to the host connection adapter 201 (S28). The host connection adapter 201 transfers the tag information to the cache control unit 207 (S29). The cache control unit 207 determines a hit/miss on the basis of the tag information (S30). The cache control unit 207 notifies the device-controller main unit 202 of the determination result (S31), whereby the cache determining process ends. The tag information in S28 and S29 and the notification of the determination result in S31 include the cache determining request identification information included in the cache determining request.

Figure 5:
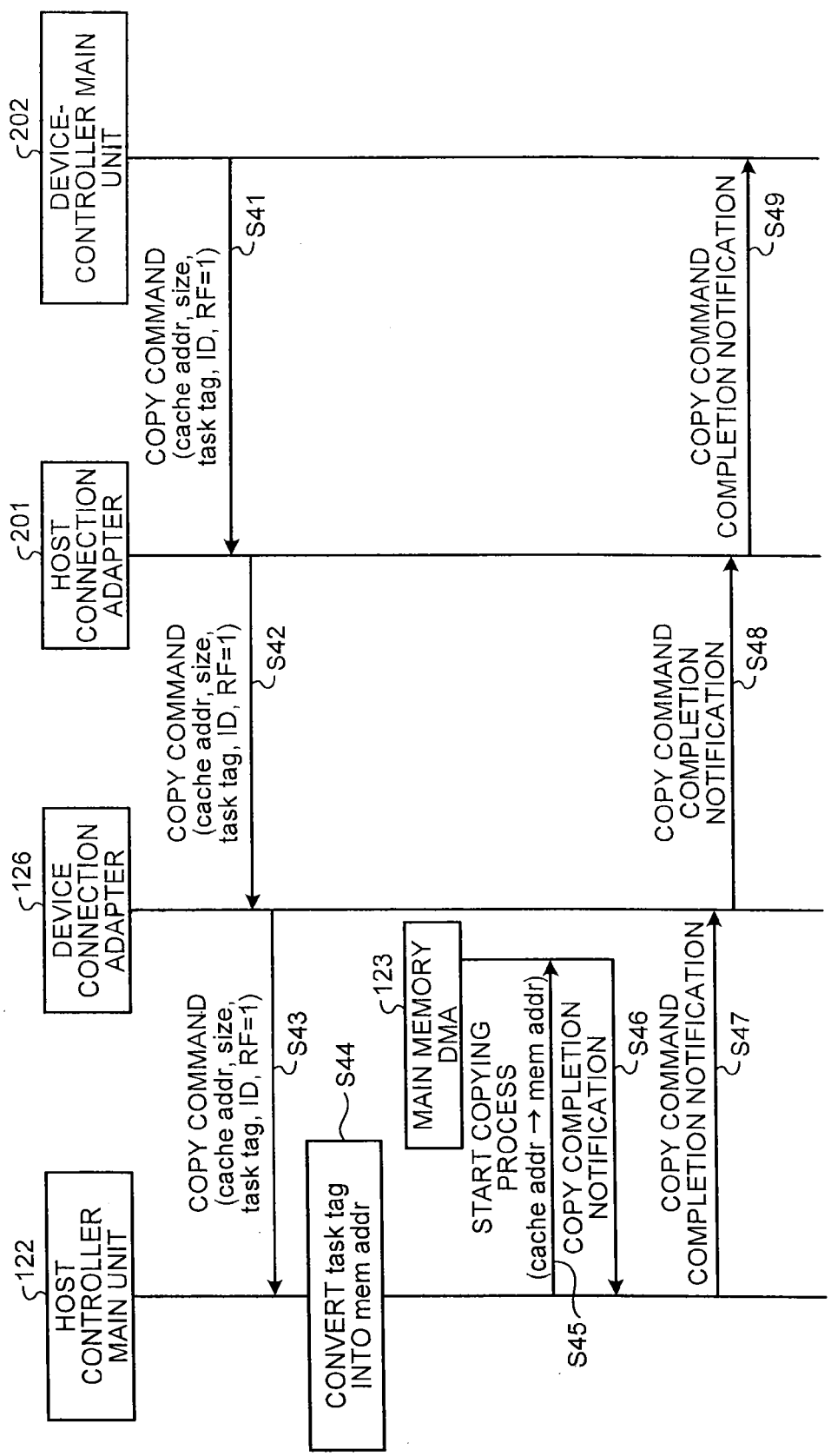
FIG. 5 is a sequence diagram explaining a hit-time transferring process.

FIG. 5 is a sequence diagram explaining the hit-time transferring process.

In the hit-time transferring process, the device-controller main unit 202 generates a copy command and transmits the generated copy command to the host connection adapter 201 (S41). The host connection adapter 201 transfers the copy command to the device connection adapter 126 (S42). The copy command received by the device connection adapter 126 is transferred to the host controller main unit 122 by the control DMA 124 (S43).

The copy command is a command that copies user data between the data cache area 400 and the host use area 101. In the case of the read process, the copy command includes an address (cache addr) that indicates a position of a cache line in which user data as a read target is stored in the data cache area 400, the data size (size), first-read-command identification information ("task tag"), copy command identification information ("ID"), and direction information (RF). The cache addr is calculated from the stor addr in accordance with a predetermined method. In FIG. 5, the device-controller main unit 202 calculates the cache addr; however, the host controller 120 may calculate the cache addr. In this case, the device-controller main unit 202 transfers the stor addr and the host controller 120 calculates the cache addr. In the copy command identification information, a different value is set for at least each piece of copy command identification information transmitted to the host 1 from the memory system 2. In the first-read-command identification information included in the copy command, the same value as that in the first-read-command identification information included in a second read command is set.

The "RF" included in a copy command will be explained here. In the write process, user data is copied from the host use area 101 to the data cache area 400. In the read process, user data is copied from the data cache area 400 to the host use area 101. The "RF" indicates the copying direction. The value of the "RF" being "0" indicates that user data is copied from the host use area 101 to the data cache area 400. The value of the "RF" being "1" indicates that user data is copied from the data cache area 400 to the host use area 101. In the read process, the value of the "RF" is set to "1".

As described above, the host controller main unit 122 stores therein the correspondence relationship between the "mem addr" and the first-read-command identification information ("task tag"). When the host controller main unit 122 receives a copy command in the process in Step S43, the host controller main unit 122 converts the first-read-command identification information included in the copy command into the "mem addr" by referring to the pre-stored correspondence relationship (S44).

The host controller main unit 122 can specify the position in the data cache area 400 by using the "cache addr" included in the copy command, specify the position in the host use area 101 by using the first-read-command identification information included in the copy command, and specify the copying direction between the two specified positions by using the "RF". The host controller main unit 122 starts the copying process performed by the main memory DMA 123 (S45). The copying process in Step S45 is such that the "cache addr" is the source address and the "mem addr" is the destination address.

The main memory DMA 123 may be configured to include therein two DMA modules that perform the copying processes of copying in different predetermined directions, respectively. In the process in Step S45, the host controller main unit 122 sets the "cache addr" as a source address and sets the "mem addr" as a destination address in one of the two DMA modules. At the same time, the host controller main unit 122 sets the "cache addr" as a destination address and sets the "mem addr" as a source address in the other of the DMA modules. Then, the host controller main unit 122 selects one of the two DMA modules on the basis of the value of the "RF" and starts the selected DMA module.

Moreover, the main memory DMA 123 may be configured to include two buffers to each of which an address is set and a switch that selects one of the addresses set in the two buffers to be used as a source address. In the process in Step S45, the host controller main unit 122 sets the "cache addr" and the "mem addr" in the two buffers. Then, the host controller main unit 122 operates the switch by using the value of the "RF" as a selection signal and starts the main memory DMA 123.

When the main memory DMA 123 completes the copying process, the main memory DMA 123 transmits a copy completion notification to the host controller main unit 122 (S46). When the host controller main unit 122 receives the copy completion notification, the host controller main unit 122 transmits a notification indicating that execution of the copy command is completed (copy command completion notification) to the device connection adapter 126 (S47). The copy command completion notification includes the copy command identification information. In the copy command identification information included in the copy command completion notification, the same value as that in the copy command identification information included in the copy command is set. The device connection adapter 126 transfers the copy command completion notification to the host connection adapter 201 (S48). The host connection adapter 201 transfers the copy command completion notification to the device-controller main unit 202 (S49). Then, the hit-time transferring process is completed. The device-controller main unit 202 can recognize that execution of the copy command transmitted in S4 is completed when it receives the copy command completion notification.

Figure 6:
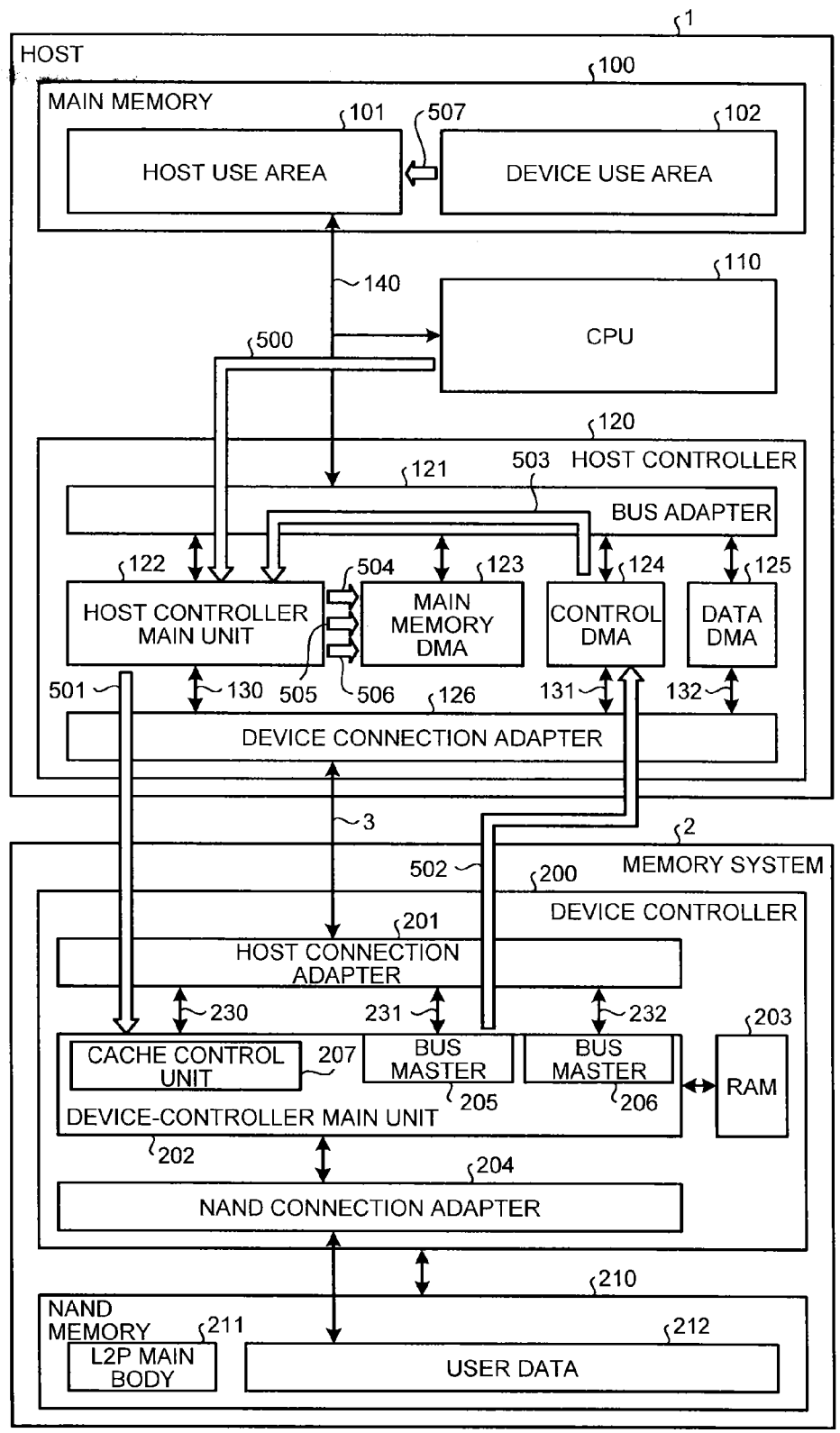
FIG. 6 is a diagram explaining the flow of commands or data.

FIG. 6 is a diagram explaining the flow of commands or data. FIG. 6 will be explained with reference to each step in FIGS. 3 and 5. The arrows indicated by the reference numbers 500 to 507 in FIG. 6 indicate the flow of commands or data.

When the CPU 110 issues a first read command, the host controller main unit 122 captures the first read command in the process in Step S1 in FIG. 3 (arrow 500). The host controller main unit 122 generates a second read command from the first read command. The second read command is transferred to the device-controller main unit 202 from the host controller main unit 122 via the first port 130, the device connection adapter 126, the communication path 3, the host connection adapter 201, and the first port 230 in the processes in Steps S3 to S5 in FIG. 3 (arrow 501). When the device-controller main unit 202 makes a hit determination, the device-controller main unit 202 generates a copy command including the "cache addr". The copy command is transferred via the bus master 205, the second port 231, the host connection adapter 201, the communication path 3, and the device connection adapter 126 and is captured by the control DMA 124 in the processes in Steps S41 to S43 in FIG. 5 (arrow 502). The control DMA 124 transfers the copy command to the host controller main unit 122 via the bus adapter 121 (arrow 503). In the process in Step S45 in FIG. 5, the host controller main unit 122 sets the "mem addr" (arrow 504) and sets the "cache addr" (arrow 505) in the main memory DMA 123 and starts the main memory DMA 123 (arrow 506). The main memory DMA 123 copies user data as a read target from the device use area 102 (more specifically, from the data cache area 400) to the host use area 101 (arrow 507).

FIG. 7 is a sequence diagram explaining the miss-time transferring process in the first embodiment.

In the miss-time transferring process, the device-controller main unit 202 first converts the "stor addr" into a physical address (NAND addr) that indicates a position in the NAND memory 210 (S51).

The process in Step S51 is performed, for example, as described below. First, it is determined whether the address translation information that indicates the correspondence relationship between the "stor addr" and the physical address is stored in the L2P cache area 300 by a process similar to the cache determining process. When the address translation information is stored in the L2P cache area 300, the device-controller main unit 202 transmits a transfer command to read the address translation information from the L2P cache area 300 to the host 1. When the host controller 120 receives the transfer command, the host controller 120 transfers the address translation information to the device-controller main unit 202 from the L2P cache area 300. When the address translation information is not stored in the L2P cache area 300, the device-controller main unit 202 reads the address translation information from the NAND memory 210. The device-controller main unit 202 converts the "stor addr" into the "NAND addr" by using the address translation information transferred from the L2P cache area 300 or the address translation information read from the NAND memory 210.

Subsequent to Step S51, the device-controller main unit 202 reads user data as a read target from the NAND memory 210 (S52). The read position of the user data as a read target is the position indicated by the "NAND addr" obtained in the process in Step S51. The device-controller main unit 202 transmits the read user data as a read target to the host connection adapter 201 (S53). The host connection adapter 201 transfers the user data as a read target to the device connection adapter 126 (S54). The host controller main unit 122 reads the user data as a read target that is received by the device connection adapter 126 (S55) and writes it in the host use area 101 (S56). The write position of the user data is the position indicated by the "mem addr". The user data as a read target in S53, S54, and S55 includes the first-read-command identification information.

In FIG. 3, the processes in Step S6 to Step S8 may be performed for each piece of data that has the size of a cache line. The user data as a read target in accordance with the second read command is specified by the "stor addr" and the "length" included in the second read command. When the "length" included in the second read command is larger than the size of a cache line, the user data as a read target in accordance with the second read command is divided into pieces of data that has the size of a cache line and the processes in Steps S6 to Step S8 are performed on each of the divided pieces of user data.

After all the pieces of user data as a read target in accordance with the second read command are stored in the host use area 101, the device-controller main unit 202 transmits a read command completion notification indicating completion of execution of the second read command to the host connection adapter 201 (S9). The host connection adapter 201 transfers the read command completion notification to the device connection adapter 126 (S10). The device connection adapter 126 transfers the read command completion notification to the host controller main unit 122 (S11). The read command completion notification is thereafter transferred to the CPU 110 and the CPU 110 receives the read command completion notification and thus can recognize completion of execution of the first read command. The first-read-command identification information is included in the read command completion notification.

As described above, according to the first embodiment of the present invention, in the read process, the memory system 2 determines whether user data is stored in the data cache area 400. Then, when the user data is stored in the data cache area 400, the host 1 copies the user data from the data cache area 400 to the host use area 101. Accordingly, it is possible to omit the transfer of the user data from the memory system 2 to the host 1 in the read process; therefore, the performance of the read process improves. In other words, the access performance can be improved by using the main memory.

Moreover, when the user data as a read target is not stored in the data cache area 400, the memory system 2 reads the user data as a read target from the NAND memory 210, transfers it to the host 1, and causes it to be stored in the host use area 101. In other words, in the case of a miss, the user data is directly stored in the host use area 101 without storing it in the data cache area 400. Accordingly, it is possible to omit not only the transfer of the user data to the cache area but also the eviction process in a case where there is a dirty cache line; therefore, the performance of the read process improves.

Moreover, the memory system 2 transmits a copy command that includes the "cache addr" indicating the position in the data cache area 400 and the direction information "RF". Accordingly, it is not necessary to provide a new different command for reading; therefore, the copying process can be realized by using a copy command having a simple configuration.

Moreover, in the host 1, the CPU 110 generates a first read command that includes the address "mem addr" indicating the position in the host use area 101 and the LBA "stor addr". When the host controller main unit 122 captures the first read command, the host controller main unit 122 stores the "mem addr" and generates a second read command that includes the "stor addr" but does not include the "mem addr", and transmits it to the memory system 2. Accordingly, it is possible to ensure the compatibility with the operations performed on normal memory systems. Then, when the host controller main unit 122 receives a copy command, the host controller main unit 122 performs the copying process, in which the "cache addr" is the source address and the pre-stored "mem addr" is the destination address, on the basis of the direction information "RF". Accordingly, the copying process is realized by using a simple copy command while ensuring the compatibility with conventional read commands.

Moreover, the data cache area 400 and the data cache tag area 410 are reserved in the main memory 100. Accordingly, it is not necessary to provide the data cache area 400 and the data cache tag area 410 in the memory system 2; therefore, the size of the RAM 203 included in the memory system 2 can be reduced.

Second Embodiment

In an information processing device in the second embodiment, the operation in the miss-time transferring process (S8) is different from that in the first embodiment. According to the second embodiment, in the miss-time transferring process, user data is stored in the data cache area 400. Then, the user data stored in the data cache area 400 is copied to the host use area 101.

FIG. 8 is a sequence diagram explaining the miss-time transferring process in the second embodiment. In the following explanation, a description of each piece of identification information will be omitted in order to avoid a complicated explanation; however, each piece of identification information is used in a similar manner to the first embodiment.

In the miss-time transferring process, the device-controller main unit 202 first transmits a storing request to the cache control unit 207 (S61). The cache control unit 207 determines whether the cache line is dirty on the basis of the DB bit included in the tag information received in the process in Step S25 (S62).

When the cache line is dirty (Yes in S62), the eviction process is performed (S63).

The eviction process is performed as follows. The cache control unit 207 specifies the address indicating the position of the cache line that is an eviction process target in the data cache area 400 on the basis of the "stor addr". Then, processes similar to the processes in Step S23 to Step S29 are performed using the position indicated by the specified address as the read position, whereby the cache control unit 207 obtains user data from the data cache area 400. Then, the cache control unit 207 writes the obtained user data in the NAND memory 210. Any method can be used as the method of determining a write destination of the user data in the NAND memory 210. For example, when a method of sequentially writing user data in unwritten pages is used, the cache control unit 207 determines an unwritten page as a position of a write destination.

When the cache line is clean (No in S62) or after the process in Step S63, the cache control unit 207 converts the "stor addr" into a physical address "NAND addr" that indicates a position in the NAND memory 210 (S64). The process in Step S64 is similar to the process in Step S51 performed by the device-controller main unit 202. Then, the cache control unit 207 reads user data as a read target from the NAND memory 210 (S65). The read position of the user data as a read target is the position indicated by the "NAND addr" obtained in the process in Step S64. The cache control unit 207 transmits the read user data as a read target to the host connection adapter 201 (S66). The host connection adapter 201 transfers the user data as a read target to the device connection adapter 126 (S67).

When the device connection adapter 126 receives the user data as a read target, the data DMA 125 starts the copying process of copying the user data from the device connection adapter 126 to the data cache area 400 (S68). The write position in the data cache area 400 is the cache line specified on the basis of the "stor addr". When the data DMA 125 completes the copying process, the data DMA 125 transmits a copy completion notification to the host controller main unit 122 (S69).

Next, the cache control unit 207 updates the tag information obtained in the cache determining process in accordance with the state after the storing process (S70). Then, the cache control unit 207 transmits to the host connection adapter 201 a transfer command to write the updated tag information to the position indicated by the address specified in the process in Step S22, which is a write position (S71). The transfer command includes the tag information updated in the process in Step S70. The host connection adapter 201 transfers the transfer command to the device connection adapter 126 (S72).

When the device connection adapter 126 receives the transfer command, the data DMA 125 starts the copying process of copying the tag information from the device connection adapter 126 to the data cache tag area 410 (S73). The write position in the data cache tag area 410 is the position indicated by the address included in the transfer command. When the data DMA 125 completes the copying process, the data DMA 125 transmits a copy completion notification to the host controller main unit 122 (S74).

When the process in Step S74 ends, the cache control unit 207 transmits a notification of completion of the storing process (storing completion notification) to the device-controller main unit 202 (S75). Then, the device-controller main unit 202 generates a copy command and transmits the generated copy command to the host connection adapter 201 (S76). The copy command transmitted in the process in Step S76 is similar to the copy command that is transmitted in the hit-time transferring process. Thereafter, in the processes in Steps S77 to S84, the processes that are equivalent to the processes in Steps S42 to S49, respectively, are performed, whereby the miss-time transferring process ends.

As described above, according to the second embodiment, when user data as a read target is not stored in the data cache area 400, the memory system 2 reads the user data as a read target from the NAND memory 210, transfers it to the host 1, and then stores the user data in the data cache area 400. Thereafter, the host 1 copies the user data as a read target stored in the data cache area 400 to the host use area 101. Accordingly, the data cache area 400 is used as a cache of the user data as a read target; therefore, the access performance with respect to the memory system 2 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the host including a host controller and a host memory comprising a first memory area and a second memory area, comprising:
    an interface unit which receives a read command and a write command from the host;
    a non-volatile memory; and
    a controller unit which
        writes write-data to the non-volatile memory according to the write command,
        determines whether read-data requested by the read command is in the first memory area,
        causes the host controller to copy the read-data from the first memory area to the second memory area when the read-data is in the first memory area, and
        reads the read-data from the non-volatile memory and causes the host controller to store the read-data read from the non-volatile memory in the second memory area when the read-data is not in the first memory area.

2. The memory system according to claim 1, wherein the controller unit acquires the write-data from the first memory area when the controller unit writes the write-data to the non-volatile memory according to the write command.

3. The memory system according to claim 1, wherein the controller unit acquires tag information stored in the first memory area for the determination, the tag information indicating whether the write-data is stored in the first memory area.

4. The memory system according to claim 1, wherein the controller unit causes the host controller to copy the read-data from a first address of the first memory area to a second address of the second memory area, the first address and the second address being determined from an address included in the read command.

5. The memory system according to claim 4, wherein the read command includes a third address and a fourth address, the third address being an address indicating a storage position of the read-data in the first memory area and the fourth address being command identification information, and the first address is determined from the third address and the second address is determined from the fourth address.

6. The memory system according to claim 4, wherein the controller unit sets a destination flag to the host controller, the destination flag indicating that said copy is from the first address to the second address.

7. The memory system according to claim 1, wherein if the read-data is not in the first memory area, the controller unit causes the host controller to store the read-data read from the non-volatile memory to the first memory area and thereafter causes the host controller to copy the read-data from the first memory area to the second memory area.

8. An information processing device comprising:
a host system comprising
a host controller, and
a host memory which comprises a first memory area and a second memory area; and
a memory system comprising
an interface unit which receives a read command and a write command from the host system,
a non-volatile memory, and
a controller unit which
writes write-data to the non-volatile memory according to the write command,
determines whether read-data requested by the read command is in the first memory area,
the controller unit
causes the host controller to copy the read-data from the first memory area to the second memory area when the read-data is in the first memory area, and
reads the read-data from the non-volatile memory and causes the host controller to store the read-data read from the non-volatile memory in the second memory area when the read-data is not in the first memory area.

9. The information processing device according to claim 8, wherein the controller unit acquires the write-data from the first memory area when the controller unit writes the write-data to the non-volatile memory according to the write command.

10. The information processing device according to claim 8, wherein the controller unit acquires tag information stored in the first memory area for the determination, the tag information being information indicating whether the write-data is stored in the first memory area.

11. The information processing device according to claim 8, wherein the controller unit causes the host controller to copy the read-data from a first address of the first memory area to a second address of the second memory area, the first address and the second address being determined from an address included in the read command.

12. The information processing device according to claim 11, wherein the read command includes a third address and a fourth address, the third address being an address indicating a storage position of the read-data in the first memory area and the fourth address being command identification information, and the first address is determined from the third address and the second address is determined from the fourth address.

13. The information processing device according to claim 12, wherein the controller unit sets a destination flag to the host controller, the destination flag indicating that said copy is from the first address to the second address.

14. The information processing device according to claim 8, wherein the write-data is first copied from the second memory area to the first memory area and then stored in the non-volatile memory.

15. The information processing device according to claim 13, wherein
the host system further includes a host processor which generates a first read command which includes the second address, the third address, and the fourth address,
the host controller stores a correspondence relationship between the second address and the fourth address which are included in the first read command, generates a second read command including the third address and the fourth address, and transmits generated second read command to the controller unit,
the controller unit determines the first address on a basis of the third address and sets determined first address, the fourth address, and the destination flag in the host controller, and
the host controller converts set fourth address into the second address on a basis of the correspondence relationship.

16. The information processing device according to claim 8, wherein if the read-data is not in the first memory area, the controller unit causes the host controller to store the read-data read from the non-volatile memory to the first memory area and thereafter causes the host controller to copy the read-data from the first memory area to the second memory area.

* * * * *